(12) United States Patent
Venghaus et al.

(10) Patent No.: US 7,698,887 B2
(45) Date of Patent: Apr. 20, 2010

(54) METHOD AND APPARATUS FOR DETERMINING LOCAL EMISSIONS LOADING OF EMISSIONS TRAP

(75) Inventors: Helmut Venghaus, Ingolstadt (DE); Lee Watts, Gerstofen (DE); Andreas Mayr, Meitingen (DE); Clive D. Telford, Lancaster (GB); Marco Ranalli, Augsburg (DE); Peter Kroner, Augsburg (DE); David Herranz, Pamplona (ES); Gregg Speer, Dachau (DE); Stefan Schmidt, Langweid/Lech. (DE); A. Steven Walleck, Lakewood, OH (US)

(73) Assignee: EMCON Technologies LLC, Wilmington, DE (US)

( * ) Notice: Subject to any disclaimer, the term of this patent is extended or adjusted under 35 U.S.C. 154(b) by 829 days.

(21) Appl. No.: 11/156,167

(22) Filed: Jun. 17, 2005

(65) Prior Publication Data

US 2006/0287802 A1    Dec. 21, 2006

(51) Int. Cl.
*F01N 3/00* (2006.01)
(52) U.S. Cl. .............................. 60/295; 60/274; 60/275; 60/297; 60/311
(58) Field of Classification Search .................. 60/274, 60/275, 295, 297, 301, 311
See application file for complete search history.

(56) References Cited

U.S. PATENT DOCUMENTS

| | | | |
|---|---|---|---|
| 2,787,730 A | 4/1957 | Berghaus et al. |
| 3,018,409 A | 1/1962 | Berghaus et al. |
| 3,035,205 A | 5/1962 | Berghaus et al. |
| 3,423,562 A | 1/1969 | Jones et al. |
| 3,594,609 A | 7/1971 | Vas |
| 3,622,493 A | 11/1971 | Crusco |
| 3,649,195 A | 3/1972 | Cook et al. |
| 3,755,131 A | 8/1973 | Shalit |
| 3,779,182 A | 12/1973 | Camacho |
| 3,841,239 A | 10/1974 | Nakamura et al. |
| 3,879,680 A | 4/1975 | Naismith et al. |
| 3,894,605 A | 7/1975 | Salvadorini |
| 3,982,962 A | 9/1976 | Bloomfield |
| 3,992,277 A | 11/1976 | Trieschmann et al. |
| 4,033,133 A | 7/1977 | Houseman et al. |
| 4,036,131 A | 7/1977 | Elmore |
| 4,036,181 A | 7/1977 | Matovich |
| 4,059,416 A | 11/1977 | Matovich |
| 4,099,489 A | 7/1978 | Bradley |
| 4,144,444 A | 3/1979 | Dementiev et al. |
| 4,168,296 A | 9/1979 | Lundquist |
| 4,338,784 A | 7/1982 | Liu et al. |

(Continued)

OTHER PUBLICATIONS http://www.ott.doe.gov./success.html, "Meeting more stringent emission standards for high fuel economy vehicles—NOx Emission Control for Light-Duty CIDI Vehicles", Apr. 2001, 2 pgs.

*Primary Examiner*—Thomas E Denion
*Assistant Examiner*—Diem Tran
(74) *Attorney, Agent, or Firm*—Carlson, Gaskey & Olds

(57) ABSTRACT

An apparatus comprises an emissions trap and a loading determination device. The emissions trap is configured to trap emissions present in exhaust gas and comprises a first local region and a second local region. The loading determination device is configured to determine emissions loading of the first local region and emissions loading of the second local region. An associated method is disclosed.

20 Claims, 3 Drawing Sheets

U.S. PATENT DOCUMENTS

| | | |
|---|---|---|
| 4,339,546 A | 7/1982 | Randalls |
| 4,436,793 A | 3/1984 | Adlhart |
| 4,450,681 A | 5/1984 | Sato et al. |
| 4,458,634 A | 7/1984 | Carr et al. |
| 4,469,932 A | 9/1984 | Spiegelberg et al. |
| 4,473,622 A | 9/1984 | Chludzinski et al. |
| 4,485,621 A | 12/1984 | Wong et al. |
| 4,522,894 A | 6/1985 | Hwang et al. |
| 4,538,412 A | 9/1985 | Oshi et al. |
| 4,538,441 A | 9/1985 | Nishikawa |
| 4,544,388 A | 10/1985 | Rao et al. |
| 4,578,955 A | 4/1986 | Medina |
| 4,625,511 A | 12/1986 | Scheitlin et al. |
| 4,625,681 A | 12/1986 | Sutekiyo |
| 4,645,521 A | 2/1987 | Freesh |
| 4,651,524 A | 3/1987 | Brighton |
| 4,655,037 A | 4/1987 | Rao |
| 4,657,829 A | 4/1987 | McElroy et al. |
| 4,670,020 A | 6/1987 | Rao |
| 4,830,492 A | 5/1989 | Ko |
| 4,841,925 A | 6/1989 | Ward |
| 4,928,227 A | 5/1990 | Burba et al. |
| 5,085,049 A | 2/1992 | Rim et al. |
| 5,095,247 A | 3/1992 | Hanamura |
| 5,138,959 A | 8/1992 | Kulkarni |
| 5,199,257 A | 4/1993 | Colletta et al. |
| 5,366,701 A | 11/1994 | Taylor et al. |
| 5,651,248 A * | 7/1997 | Kawamura .................. 60/286 |
| 5,698,012 A | 12/1997 | Yoshikawa |
| 5,746,989 A | 5/1998 | Murachi et al. |
| 5,758,496 A | 6/1998 | Rao et al. |
| 5,910,097 A | 6/1999 | Boegner et al. |
| 5,927,069 A | 7/1999 | Wang et al. |
| 5,950,424 A | 9/1999 | Nojima |
| 5,953,909 A | 9/1999 | Waltrip, III |
| 5,974,791 A | 11/1999 | Hirota et al. |
| 6,090,187 A | 7/2000 | Kumagai |
| 6,105,365 A | 8/2000 | Deeba et al. |
| 6,134,883 A | 10/2000 | Kato et al. |
| 6,170,259 B1 | 1/2001 | Boegner et al. |
| 6,176,078 B1 | 1/2001 | Balko et al. |
| 6,428,755 B1 | 8/2002 | Rao et al. |
| 6,560,958 B1 | 5/2003 | Bromberg et al. |
| 6,679,051 B1 | 1/2004 | Nieustadt et al. |
| 6,708,486 B2 | 3/2004 | Hirota et al. |
| 6,742,328 B2 | 6/2004 | Webb et al. |
| 6,745,560 B2 | 6/2004 | Stroia et al. |
| 6,772,584 B2 * | 8/2004 | Chun et al. .................. 60/275 |
| 6,779,339 B1 | 8/2004 | Laroo et al. |
| 6,832,473 B2 | 12/2004 | Kupe et al. |
| 7,254,940 B2 * | 8/2007 | Saitoh et al. .................. 60/295 |
| 7,258,723 B2 * | 8/2007 | Crawley et al. .................. 95/5 |
| 2002/0012618 A1 | 1/2002 | Bromberg et al. |
| 2002/0194835 A1 | 12/2002 | Bromberg et al. |
| 2003/0066287 A1 | 4/2003 | Hirota et al. |
| 2003/0074893 A1 | 4/2003 | Webb et al. |
| 2003/0233824 A1 | 12/2003 | Chun et al. |
| 2004/0006977 A1 | 1/2004 | Nakatani et al. |
| 2006/0096277 A1* | 5/2006 | Surnilla et al. ................. 60/286 |
| 2006/0156791 A1* | 7/2006 | Tikkanen et al. ........... 73/23.33 |

* cited by examiner

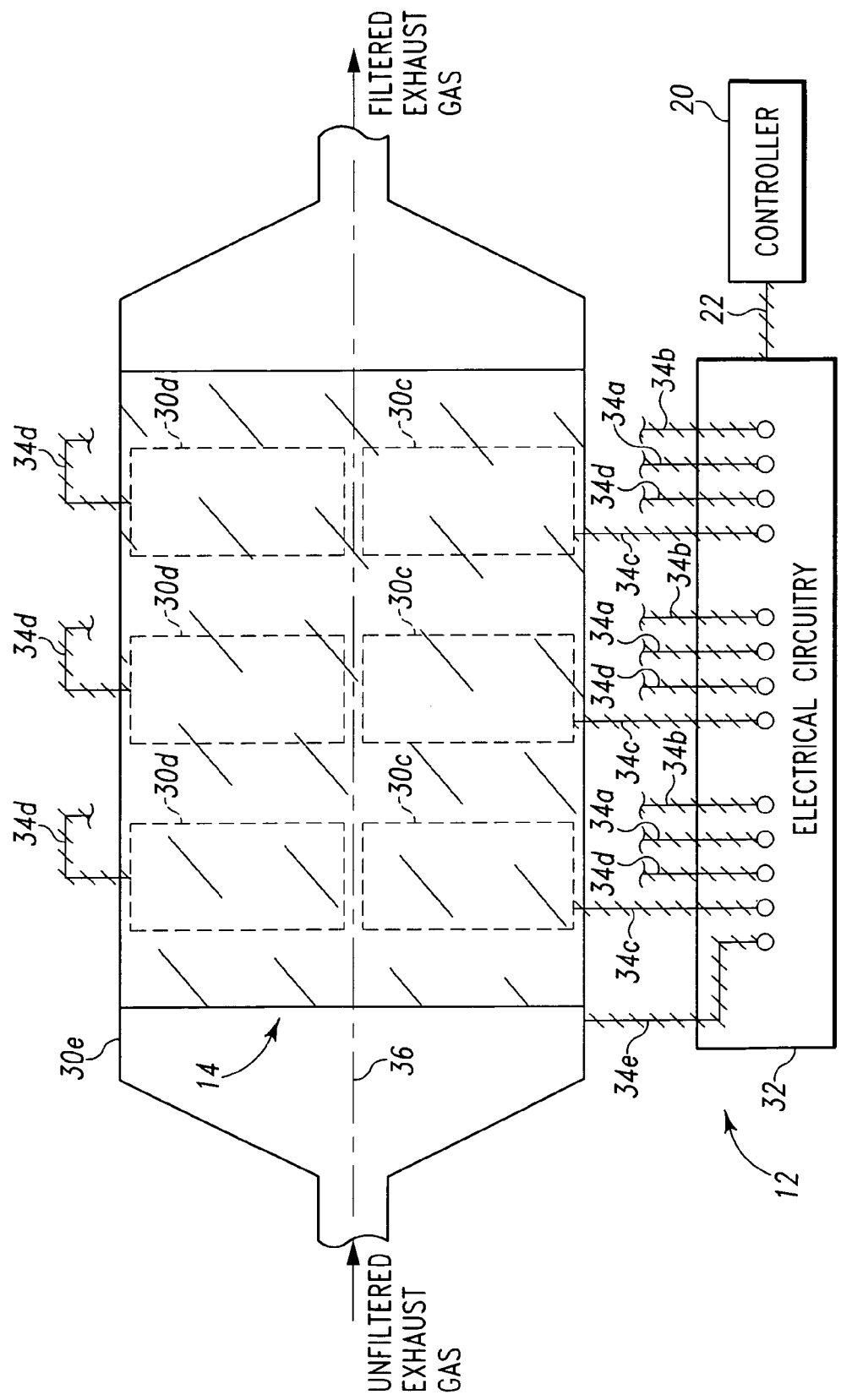

US 7,698,887 B2

METHOD AND APPARATUS FOR DETERMINING LOCAL EMISSIONS LOADING OF EMISSIONS TRAP

FIELD OF THE DISCLOSURE

The present disclosure relates generally to emissions traps for trapping emissions present in exhaust gas.

BACKGROUND OF THE DISCLOSURE

Emissions traps are used to trap and thus remove emissions from exhaust gas to reduce discharge of emissions to the atmosphere. From time to time, emissions traps are "regenerated." During such regeneration events, emissions trapped by an emissions trap are purged therefrom for further use of the emissions trap.

A soot trap is one type of emissions trap. A soot trap is used to trap and thus remove soot from exhaust exhaust. It is regenerated by burning off the soot trapped thereby.

A NOx trap is another type of emissions trap. A NOx trap is used to trap and thus remove NOx (i.e., oxides of nitrogen) from exhaust gas when the exhaust gas is relatively lean (i.e., has excess oxygen). The NOx trap is regenerated in the presence of a NOx-reducing agent [e.g., fuel, hydrogen ($H_2$), carbon monoxide].

SUMMARY OF THE DISCLOSURE

According to an aspect of the present disclosure, there is provided an apparatus for determining local emissions loading of an emissions trap and regenerating the emissions trap when local emissions loading of the emissions trap satisfies predetermined regeneration criteria. The apparatus comprises a loading determination device configured to determine emissions loading of a first local region of the emissions trap and emissions loading of a second local region of the emissions trap. The emissions trap is regenerated if such emissions loading information about the first and second local regions satisfies the predetermined regeneration criteria.

The emissions trap may be, for example, a soot trap or a NOx trap. In the case of a soot trap, the loading determination device is configured to determine soot loading of the first local region and soot loading of the second local region. In the case of NOx trap, the loading determination device is configured to determine NOx loading of the first local region and NOx loading of the second local region.

In an implementation, the loading determination device is configured to measure an electrical resistance of the first local region and an electrical resistance of the second local region. Such measured electrical resistance is representative of the emissions loading (e.g., soot loading, NOx loading) of the local regions.

According to another aspect of the disclosure, an associated method is disclosed.

The above and other features of the present disclosure will become apparent from the following description and the attached drawings.

BRIEF DESCRIPTION OF THE DRAWINGS

FIG. 3 is a sectional view taken along lines 3-3 of FIG. 2 showing another example of the loading determination device of FIG. 1.

DETAILED DESCRIPTION OF THE DRAWINGS

Figure 1:
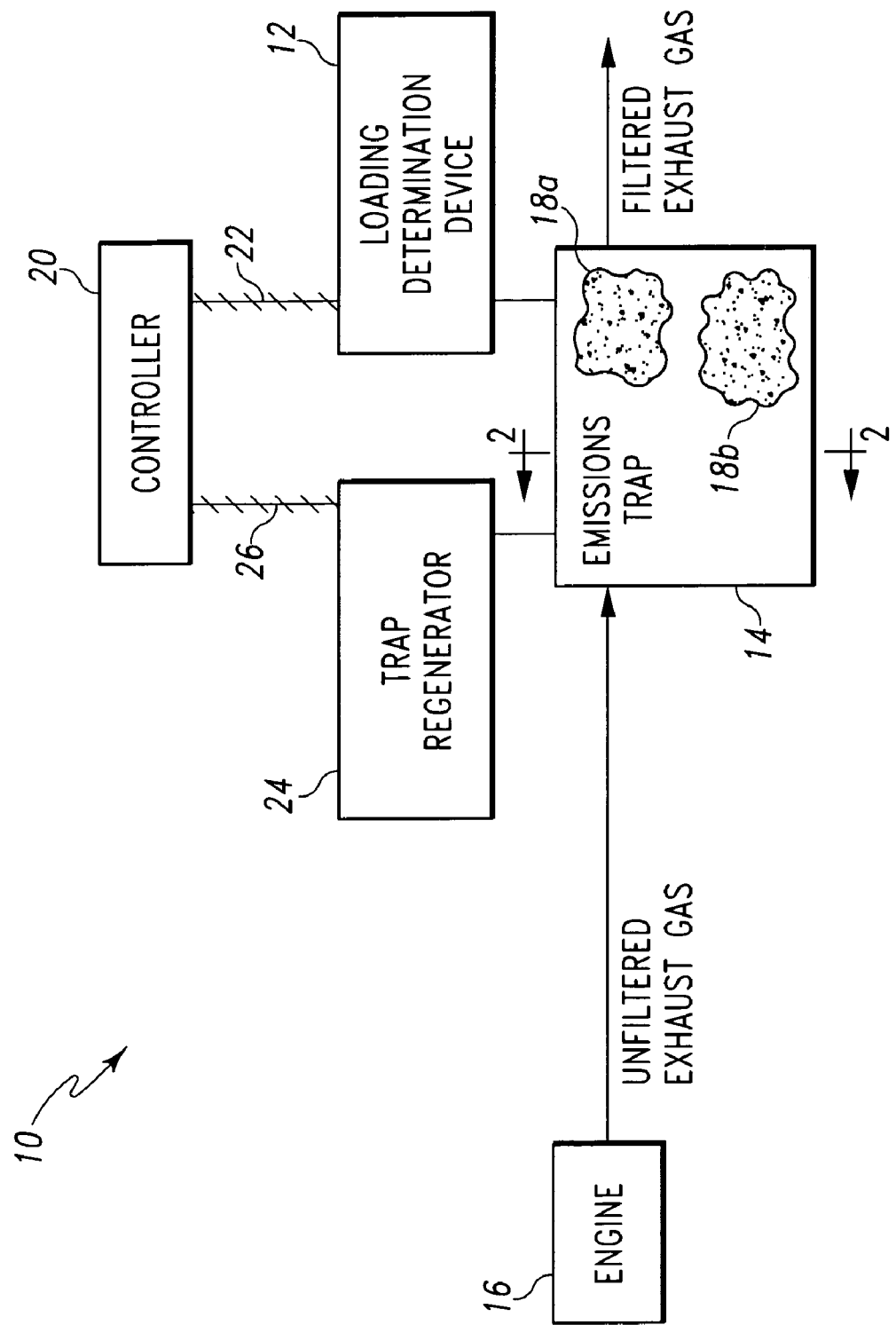
FIG. 1 is a simplified block diagram showing an apparatus for determining local emissions loading of an emissions trap and regenerating the emissions trap if emissions loading information about local regions of the emissions trap satisfies predetermined regeneration criteria.

While the concepts of the present disclosure are susceptible to various modifications and alternative forms, specific exemplary embodiments thereof have been shown by way of example in the drawings and will herein be described in detail. It should be understood, however, that there is no intent to limit the disclosure to the particular forms disclosed, but on the contrary, the intention is to cover all modifications, equivalents, and alternatives following within the spirit and scope of the invention as defined by the appended claims.

Referring to FIG. 1, there is shown an apparatus 10 including a loading determination device 12 configured to determine local emissions loading of an emissions trap 14 configured to trap emissions present in exhaust gas of an internal combustion engine 16 (e.g., diesel engine). The device 12 is configured to determine emissions loading of a plurality of local regions of the emissions trap 14. Illustratively, the device 12 is configured to determine emissions loading of a first local region 18*a* of the emissions trap 14 and emissions loading of a second local region 18*b* of the emissions trap 14. The device 12 thus provides means for determining emissions loading of a first local region of the emissions trap 14 and emissions loading of a second local region of the emissions trap 14.

The emissions trap 14 may be, for example, a soot trap configured as a catalyzed or uncatalyzed substrate to trap soot present in exhaust gas. In such a case, the device 12 is configured to determine local soot loading of a plurality of regions of the soot trap (e.g., local region 18*a* and local region 18*b*). The device 12 thus provides means for determining soot loading of a first local region 18*a* of the soot trap and soot loading of a second local region 18*b* of the soot trap.

In another example, the emissions trap 14 may be a NOx trap to trap NOx present in exhaust gas. In such a case, the device 12 is configured to determine local NOx loading of a plurality of regions of the NOx trap (e.g., local region 18*a* and local region 18*b*). The device 12 thus provides means for determining NOx loading of a first local region 18*a* of the NOx trap and NOx loading of a second local region 18*b* of the NOx trap.

It is to be understood that what is meant herein by the term "local region" of the emissions trap 14 is only a portion of the emissions trap 14 rather than the emissions trap as a whole. The device 12 is thus able to determine emissions loading of a first portion or "local region" of the emissions trap 14, emissions loading of a second portion or "local region" of the emissions trap 14, and possibly other portions or "local regions" of the emissions trap 14. As such, in the case where the trap 14 is a soot trap, the device 12 operates in a manner that is different from systems that determine the overall soot loading of a soot trap as a whole (e.g., by measuring the pressure drop across the soot trap using a pressure sensor upstream from the soot trap and a pressure sensor downstream from the soot trap). In addition, in the case where the trap 14 is a NOx trap, the device 12 operates in a manner that is different from systems that determine the overall NOx loading of a NOx trap as a whole (e.g., by measuring NOx loading with NOx sensors present upstream and downstream from the NOx trap).

A controller 20 is electrically coupled to the device 12 via an electrical line 22 to receive the emissions loading information (e.g., soot loading information, NOx loading information) from the device 12. The controller 20 is further electrically coupled to a trap regenerator 24 via an electrical line 26 to operate the trap regenerator 24 to regenerate the emissions trap 14 if the emissions loading information about the local regions 18a and 18b and other tested local regions, if any, of the emissions trap 14 satisfies predetermined regeneration criteria. For example, in the case where the trap 14 is a soot trap, the controller 20 operates the trap regenerator 24 to burn off soot trapped by the soot trap to thereby regenerate the soot trap if the soot loading information about the tested local regions satisfies the predetermined regeneration criteria. In the case where the trap 14 is a NOx trap, the controller 20 operates the trap regenerator 24 to introduce a NOx-reducing agent [e.g., fuel, hydrogen ($H_2$), carbon monoxide] to the NOx trap to reduce NOx trapped by the NOx trap to thereby regenerate the NOx trap if the NOx loading information about the tested local regions satisfies the predetermined regeneration criteria.

Figure 2:
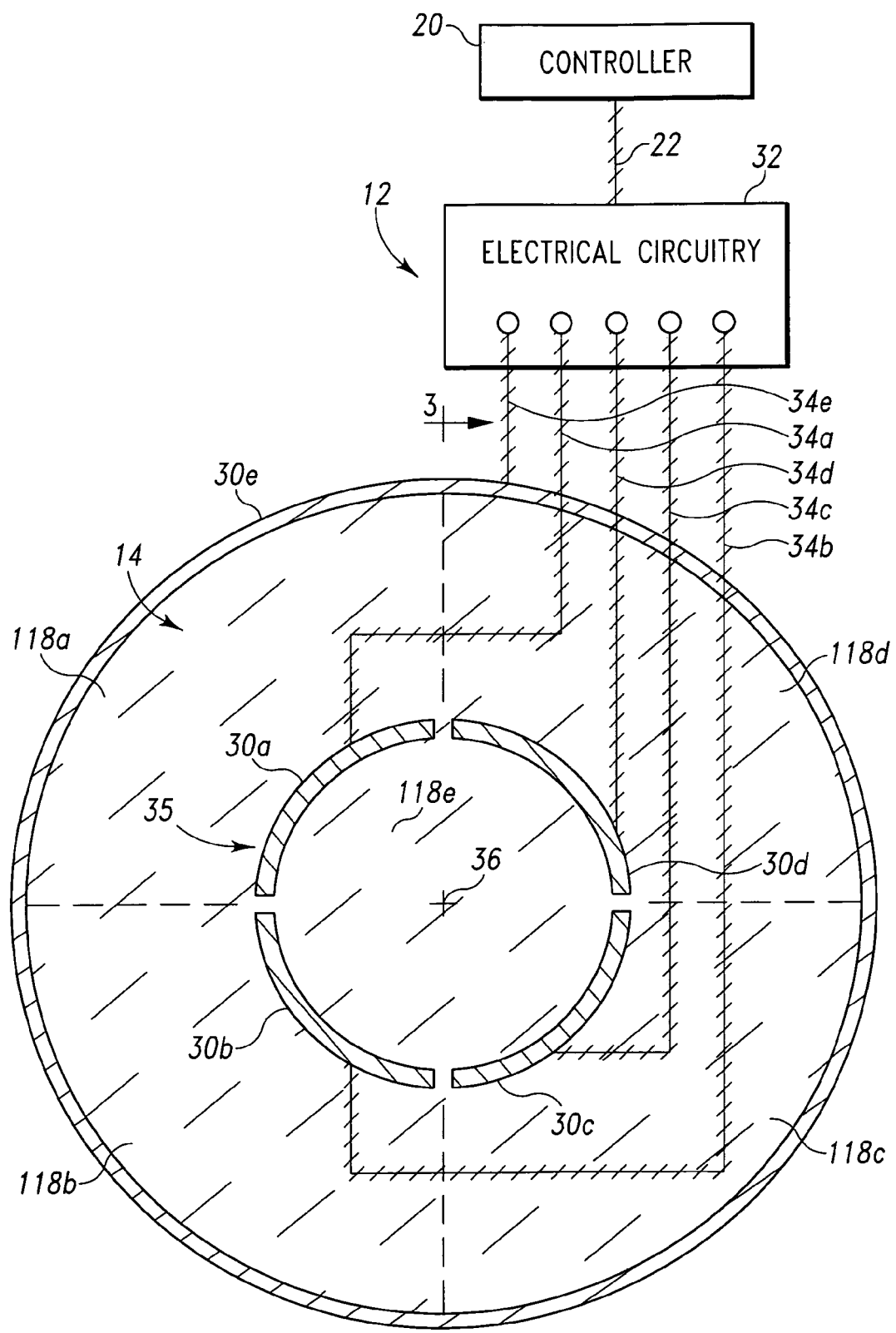
FIG. 2 is sectional view taken along lines 2-2 of FIG. 1 showing an example of a loading determination device of FIG. 1.

Referring to FIG. 2, there is shown a non-limiting example of the loading determination device 12 for use with the emissions trap 14 configured, for example, as a soot trap, a NOx trap, or other emissions trap. In this example, the device 12 is configured to determine emissions loading of a plurality of local regions 118a, 118b, 118c, 118d, 118e of the emissions trap 14 by measuring the electrical resistance of each local region 118a, 118b, 118c, 118d, 118e. Such measured electrical resistance is representative of the emissions loading of the respective local region. For example, in the case where the trap 14 is a soot trap, such measured electrical resistance is representative of the soot loading of the respective local region since electrical resistance tends to decrease with an increase in soot loading due to the electrical conductivity of soot. In the case where the trap 14 is a NOx trap, such measured electrical resistance is representative of the NOx loading of the respective local region.

In the particular non-limiting example shown in FIG. 2, the device 12 includes four spaced-apart internal electrodes 30a, 30b, 30c, 30d internal to the emissions trap 14, an external electrode 30e that is external to the emissions trap 14 and is configured as a housing surrounding the emissions trap 14, electrical circuitry 32, and electrical lines 34a, 34b, 34c, 34d, 34e electrically coupling the electrical circuitry 32 to the electrodes 30a, 30b, 30c, 30d, 30e. The internal electrodes 30a, 30b, 30c, 30d cooperate to provide a ring-shaped set 35 of internal electrodes positioned circumferentially about a central, longitudinal axis 36 of the emissions trap 14 relative to one another. The internal electrodes 30a, 30b, 30c, 30d thus cooperate with the external electrode 30e to define an annular outer region of the emissions trap 14 comprising the local regions 118a, 118b, 118c, 118d which are positioned circumferentially about the axis 36 relative to one another. The local region 118e is defined within the internal electrodes 30a, 30b, 30c, 30d. As such, the inner local region 118e is positioned radially inwardly relative to the axis 36 with respect to the outer local regions 118a, 118b, 118c, 118d.

The electrical circuitry 32 is configured to apply a voltage between a selected pair of the electrodes 30a, 30b, 30c, 30d, 30e to determine the electrical resistance and thus the emissions loading (e.g., soot loading, NOx loading) of the associated local region 118a, 118b, 118c, 118d, 118e and to provide a signal representative of the emissions loading of that local region to the controller 20 via the electrical line 22. The electrical circuitry 32 applies a voltage between electrodes 30a and 30e to determine the electrical resistance and thus emissions loading of the outer local region 118a, applies a voltage between electrodes 30b and 30e to determine the electrical resistance and thus emissions loading of the outer local region 118b, applies a voltage between electrodes 30c and 30e to determine the electrical resistance and thus emissions loading of the outer local region 118c, and applies a voltage between the electrodes 30d and 30e to determine the electrical resistance and thus emissions loading of the outer local region 118d. To determine the electrical resistance and thus emissions loading of the inner local region 118e, the electrical circuitry 32 applies a voltage between opposed electrodes 30a and 30c or opposed electrodes 30b and 30d. As such, the loading determination device 12 is configured to determine circumferential and radial distribution of emissions (e.g., soot, NOx) in the emissions trap 14.

The electrical circuitry 32 is electrically coupled to the controller 20 via the electrical line 22. As such, the electrical circuitry 32 is configured to send to the controller 20 signals representative of electrical resistance information and thus emissions loading information (e.g., soot loading information, NOx loading information) about the local regions 118a, 118b, 118c, 118d, 118e. In response thereto, the controller 20 is configured to operate the trap regenerator 24 to regenerate the trap 14 if the electrical resistance information/emissions loading information satisfies predetermined regeneration criteria.

As alluded to above, the electrical circuitry 32 serves as a voltage source to apply the voltage between the electrodes. The applied voltage may be an AC voltage (i.e., alternating current voltage) or a DC voltage (i.e., direct current voltage). A relatively high AC voltage (in the kilovolt or megavolt range) would facilitate resolution of the electrical resistance and emissions loading of the associated local region 118a, 118b, 118c, 118d, 118e. It should be understood that the electrical circuitry 32 may include one or more electrical resistors and/or other electronic devices (not shown) to facilitate determination of the electrical resistances of the local regions 118a, 118b, 118c, 118d, 118e.

Referring to FIG. 3, there is shown another non-limiting example of the loading determination device 12 for use with the emissions trap 14 configured, for example, as a soot trap, a NOx trap, or other emissions trap. In this example, the device 12 is configured to determine not only circumferential and radial distribution of emissions in the emissions trap 14 but also axial distribution of emissions in the emissions trap 14. The device 12 is thus configured to determine circumferential, radial, and axial distribution of soot in the trap 14 when the trap 14 is a soot trap and to determine circumferential, radial, and axis distribution of NOx in the trap 14 when the trap 14 is a NOx trap.

As such, in this particular additional example of the device 12, the device 12 includes a plurality of ring-shaped sets 35 of circumferentially-spaced internal electrodes 30a, 30b, 30c, 30d arranged as shown in FIG. 2. The internal electrode sets 35 are positioned axially along the axis 36 relative to one another to measure the electrical resistances and thus emissions loading (e.g., soot loading, NOx loading) of the local regions 118a, 118b, 118c, 118d, 118e at various axial locations along the axis 36. Illustratively, there are three such ring-shaped sets 35 of internal electrodes, although there may be only two sets 35 or more than three sets 35. It is further within the scope of this disclosure for there to be only one set 35 of internal electrodes.

In the case where there are multiple internal electrode sets 35, the outer electrode/housing 30e surrounds each electrode set 35 and is electrically coupled to the electrical circuitry 32 via the electrical line 34e. In addition, each internal electrode set 35 has associated therewith the electrical lines 34a, 34b, 34c, 34d electrically coupling the internal electrodes 30a, 30b, 30c, 30d to the electrical circuitry 32. The electrical circuitry 32 is thus configured to apply an AC or DC voltage between selected pairs of electrodes 30a, 30b, 30c, 30d, 30e and to provide signals representative of electrical resistance information and thus emissions loading information (e.g., soot loading information, NOx loading information) about the local regions 118a, 118b, 118c, 118d, 118e of the emissions trap 14 to the controller 20.

As such, the electrical circuitry 32 is configured to send to the controller 20 signals representative of electrical resistance information/emissions loading information about the local regions 118a, 118b, 118c, 118d, 118e at axial locations along the axis 36. In response thereto, the controller 20 is configured to operate the trap regenerator 24 to regenerate the trap 14 if the electrical resistance information/emissions loading information satisfies predetermined regeneration criteria.

It is within the scope of this disclosure for the electrical circuitry 32 to take electrical resistance readings in a serial manner or in a parallel manner. In particular, the electrical circuitry 32 may take electrical resistance readings one at a time or may take two or more electrical resistance readings simultaneously.

It is within the scope of this disclosure for the predetermined regeneration criteria to take a variety of forms. In a non-limiting example, regeneration may be initiated if emissions loading (e.g., soot loading, NOx loading) of only one of the tested local regions exceeds a predetermined threshold. In another non-limiting example, regeneration may be initiated if emissions loading (e.g., soot loading, NOx loading) of some combination of tested local regions exceeds a predetermined threshold.

While the concepts of the present disclosure have been illustrated and described in detail in the drawings and foregoing description, such illustration and description is to be considered as exemplary and not restrictive in character, it being understood that only illustrative embodiments have been shown and described and that all changes and modifications that come within the spirit of the disclosure are desired to be protected.

There are a plurality of advantages of the concepts of the present disclosure arising from the various features of the systems described herein. It will be noted that alternative embodiments of each of the systems of the present disclosure may not include all of the features described yet still benefit from at least some of the advantages of such features. Those of ordinary skill in the art may readily devise their own implementations of a system that incorporate one or more of the features of the present disclosure and fall within the spirit and scope of the invention as defined by the appended claims.

The invention claimed is:

1. A method of controlling a trap regenerator, comprising receiving an electrical resistance measurement of a first local region of an emissions trap that is indicative of emissions loading of the first local region,
receiving an electrical resistance measurement of a second local region of the emissions trap that is indicative of emissions loading of the second local region,
generating the electrical resistance measurements of the first and the second local regions by applying a voltage between at least two electrodes that are spaced apart from each other at each of the first and the second local regions, and
generating a control signal for the trap regenerator that results in the trap regenerator regenerating the trap in response to determining that received electrical resistance measurements for the first local region and the second local region satisfy predetermined regeneration criteria.

2. The method of claim 1, further comprising generating the control signal to regenerate the emissions trap if the electrical resistance measurements for the first and second local regions satisfy predetermined regeneration criteria.

3. The method of claim 1, wherein the emissions trap is a soot trap comprising the first and second local regions, further comprising
generating the electrical resistance measurement for the first local region based upon a soot loading of the first local region of the soot trap, and
generating the electrical resistance measurement for the second local region based upon a soot loading of the second local region of the soot trap.

4. The method of claim 1, wherein the emissions trap is a NOx trap comprising the first and second local regions, further comprising
generating the electrical resistance measurement for the first local region based upon a NOx loading of the first local region of the NOx trap, and
generating the electrical resistance measurement for the second local region based upon a NOx loading of the second local region of the NOx trap.

5. The method of claim 1 including spacing the electrodes apart from each other in a radial direction.

6. The method of claim 1 including spacing the electrodes apart from each other in an axial direction.

7. The method of claim 1 wherein the at least two electrodes comprises at least one external electrode that is external to the emissions trap, a first electrode located at the first local region, and a second electrode located at the second local region.

8. A method of controlling a trap regenerator, comprising
receiving an electrical resistance measurement of a first local region of an emissions trap that is indicative of emissions loading of the first local region, generating the electrical resistance measurement of the first local region based upon applying a voltage between a first internal electrode internal to the emissions trap and an external electrode external to the emissions trap,
receiving an electrical resistance measurement of a second local region of the emissions trap that is indicative of emissions loading of the second local region, generating the electrical resistance measurement of the second local region based upon applying a voltage between the external electrode and a second internal electrode internal to the emissions trap or between the second internal electrode and a third internal electrode internal to the emissions trap, and
generating a control signal for the trap regenerator that results in the trap regenerator regenerating the trap in response to determining that received electrical resistance measurements for the first local region and the second local region satisfy predetermined regeneration criteria.

9. An apparatus, comprising:
an emissions trap that is configured to trap emissions present in exhaust gas and that comprises a first local region and a second local region,
a determining device to measure an electrical resistance of the first local region and an electrical resistance of the second local region, the determining device including at least two electrodes spaced apart from each other at each of the first and second local regions, and a trap regenerator and a controller that is coupled to the determining device to receive therefrom electrical resistance information about the first and second local regions and that is coupled to the trap regenerator to operate the trap regenerator to regenerate the emissions trap if the electrical resistance information about the first and second local regions satisfies predetermined regeneration criteria.

10. The apparatus of claim 9, wherein the first and second local regions are positioned circumferentially about an axis of the emissions trap relative to one another such that the determining device is configured to determine circumferential distribution of emissions between the first and second local regions.

11. The method of claim 9, wherein the first and second local regions are positioned radially relative to one another with respect to an axis of the emissions trap such that the determining means is configured to determine radial distribution of emissions between the first and second local regions.

12. The method of claim 9, wherein the first and second local regions are positioned axially along an axis of the emissions trap relative to one another such that the determining device is configured to determine axial distribution of emissions between the first and second local regions.

13. The apparatus of claim 9, wherein the at least two electrodes comprises at least one external electrode that is external to the emissions trap, a first internal electrode located at the first local region, and a second internal electrode located at the second local region.

14. An apparatus, comprising:
an emissions trap that is configured to trap emissions present in exhaust gas and that comprises a first local region and a second local region,
a determining device to measure an electrical resistance of the first local region and an electrical resistance of the second local region wherein the determining device comprises (i) a generally ring-shaped first set of internal electrodes internal to the emissions trap and positioned circumferentially about an axis of the emissions trap relative to one another and (ii) an external electrode configured as a housing surrounding the emissions trap and the first set of internal electrodes, and
a trap regenerator and a controller that is coupled to the determining device to receive therefrom electrical resistance information about the first and second local regions and that is coupled to the trap regenerator to operate the trap regenerator to regenerate the emissions trap if the electrical resistance information about the first and second local regions satisfies predetermined regeneration criteria.

15. The apparatus of claim 14, wherein:
the determining means comprises a generally ring-shaped second set of internal electrodes internal to the emissions trap and positioned circumferentially about the axis relative to one another,
the first and second sets of internal electrodes are positioned axially along the axis relative to one another, and
the housing surrounds the second set of internal electrodes.

16. An apparatus, comprising:
an emissions trap that is configured to trap emissions present in exhaust gas and that comprises a first local region and a second local region,
a determining device to measure an electrical resistance of the first local region and an electrical resistance of the second local region wherein the determining device comprises a first internal electrode internal to the emissions trap, a second internal electrode internal to the emissions trap, and an external electrode external to the emissions trap, and
a trap regenerator and a controller that is coupled to the determining device to receive therefrom electrical resistance information about the first and second local regions and that is coupled to the trap regenerator to operate the trap regenerator to regenerate the emissions trap if the electrical resistance information about the first and second local regions satisfies predetermined regeneration criteria.

17. An apparatus, comprising:
an emissions trap that is configured to trap emissions present in exhaust gas and that comprises a first local region and a second local region, and
a loading determination device configured to determine emissions loading of the first local region and emissions loading of the second local region based upon an electrical resistance measurement of the first local region and an electrical resistance measurement of the second local region, and wherein the load determination device including at least two electrodes that are spaced apart from each other at each of the first and second local regions with a voltage being applied between electrodes to determine the electrical resistance.

18. The apparatus of claim 17, wherein the emissions trap is a soot trap.

19. The apparatus of claim 17, wherein the emissions trap is a NOx trap.

20. The apparatus of claim 17, wherein the at least two electrodes comprises at least one external electrode that is external to the emissions trap, a first internal electrode located at the first local region, and a second internal electrode located at the second local region.

* * * * *